(12) United States Patent
Filip et al.

(10) Patent No.: US 12,001,565 B2
(45) Date of Patent: Jun. 4, 2024

(54) FALSE-POSITIVES INVALIDATION AND STATIC SECURITY SCANS WITHOUT SCANNING BASED ON REGULAR SCAN HISTORY IN PULL REQUESTS

(71) Applicant: International Business Machines Corporation, Armonk, NY (US)

(72) Inventors: Marcin Filip, Cracow (PL); Michal Bodziony, Tegoborze (PL); Marcin Luczynski, Cracow (PL); Tomasz Zatorski, Cracow (PL); Wojciech Mis, Cracow (PL); Bartosz Tomasik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 17/301,767

(22) Filed: Apr. 14, 2021

(65) Prior Publication Data
US 2022/0335134 A1 Oct. 20, 2022

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
USPC .......................................................... 726/25
See application file for complete search history.

(56) References Cited

U.S. PATENT DOCUMENTS

| | | | |
|---|---|---|---|
| 9,692,778 B1* | 6/2017 | Mohanty | G06F 21/577 |
| 10,503,908 B1* | 12/2019 | Bellis | G06F 16/9032 |
| 10,769,250 B1* | 9/2020 | Tautschnig | G06F 21/577 |
| 2013/0024942 A1* | 1/2013 | Wiegenstein | G06F 21/556 |
| | | | 726/25 |
| 2013/0174262 A1 | 7/2013 | Amit | |
| 2015/0150132 A1* | 5/2015 | Lee | H04L 63/1441 |
| | | | 726/23 |
| 2019/0018967 A1 | 1/2019 | Ramasamy | |
| 2019/0318100 A1* | 10/2019 | Bhatia | G06F 21/57 |
| 2019/0363893 A1* | 11/2019 | Mahaffey | H04L 43/04 |
| 2020/0341752 A1 | 10/2020 | Lim | |
| 2021/0182182 A1* | 6/2021 | Felisatti | G06F 11/3688 |

OTHER PUBLICATIONS

"What is Guardrails", © 2020 GuardRails, 6 pages, <https://docs.guardrails.io/docs/en/what-is-guardrails>.
Disclosed Anonymously et al., "System for Self-Validating Static Security Scans", An IP.com Prior Art Database Technical Disclosure, IP.com No. IPCOM000259592D, IP.com Electronic Publication Date: Aug. 27, 2019, 6 pages.
(Continued)

*Primary Examiner* — Bassam A Noaman
(74) *Attorney, Agent, or Firm* — Stosch Sabo

(57) ABSTRACT

Providing an automatic mechanism of invalidating false-positive indications of certain identified portions of source code to reduce the number of errors in a security report. Certain embodiments of the present invention utilize static security scanning as a mechanism for automatically determining which portions of the identified source code contain potential vulnerabilities, and whether these identified portions of the source code are correctly or incorrectly identified with a false-positive indication.

18 Claims, 6 Drawing Sheets

(56) References Cited

OTHER PUBLICATIONS

Maddoxx III, William H., "Incremental Static Semantic Analysis", University of California, Berkeley, Technical Report No. UCB/CSD-97-948, May 1997, 4 pages.
Seidel et al., "Incremental Abstract Interpretation", (Abstract Only), SpringerLink, First Online: Feb. 15, 2020, 6 pages.

* cited by examiner

Review required
At least 1 approving review is required by reviewers with write access. Learn more.

Hide all checks

Some checks were not successful
1 errored and 1 expected checks

Security - found 6 similar vulnerabilities in the security issues database

Details

Review required
At least 1 approving review is required by reviewers with write access. Learn more.

Hide all checks

Some checks were not successful
1 errored and 1 expected checks

Security subscan failed - Vulnerabilities were found

Details

FALSE-POSITIVES INVALIDATION AND STATIC SECURITY SCANS WITHOUT SCANNING BASED ON REGULAR SCAN HISTORY IN PULL REQUESTS

BACKGROUND

The present invention relates generally to the field of security scans, and more particularly to determining whether portions of code or individual lines of code are accurately classified as having a security concern.

The terms "static security scan" and "static application security testing" are used interchangeably in this document. The Wikipedia entry for "Static application security testing" (as of Mar. 22, 2021) states as follows: "Static application security testing (SAST) is used to secure software by reviewing the source code of the software to identify sources of vulnerabilities . . . SAST is performed early in the development process and at code level, and also when all pieces of code and components are put together in a consistent testing environment. SAST is also used for software quality assurance . . . even if the many resulting false-positive impede its adoption by developers."

SUMMARY

According to an aspect of the present invention, there is a method, computer program product and/or system that performs the following operations (not necessarily in the following order): (i) receiving, from a target repository, a set of source code from a first operating environment; (ii) scanning, during a pull request of the target repository, the set of source code; (iii) determining, by a security determination module, that a first subset of the source code includes a security vulnerability; (iv) analyzing the operating environment for the set of source code and the target repository; (v) responsive to the analysis of the operating environment, determining that the security vulnerability of the first subset of the source code cannot be exploited; and (vi) responsive to the determination, returning a false positive notification for the security vulnerability.

BRIEF DESCRIPTION OF THE DRAWINGS

FIG. 4A is a screenshot view generated by the first embodiment system;

FIG. 4B is a screenshot view generated by the first embodiment system;

FIG. 4C is a screenshot view generated by the first embodiment system; and

DETAILED DESCRIPTION

Figure 1:
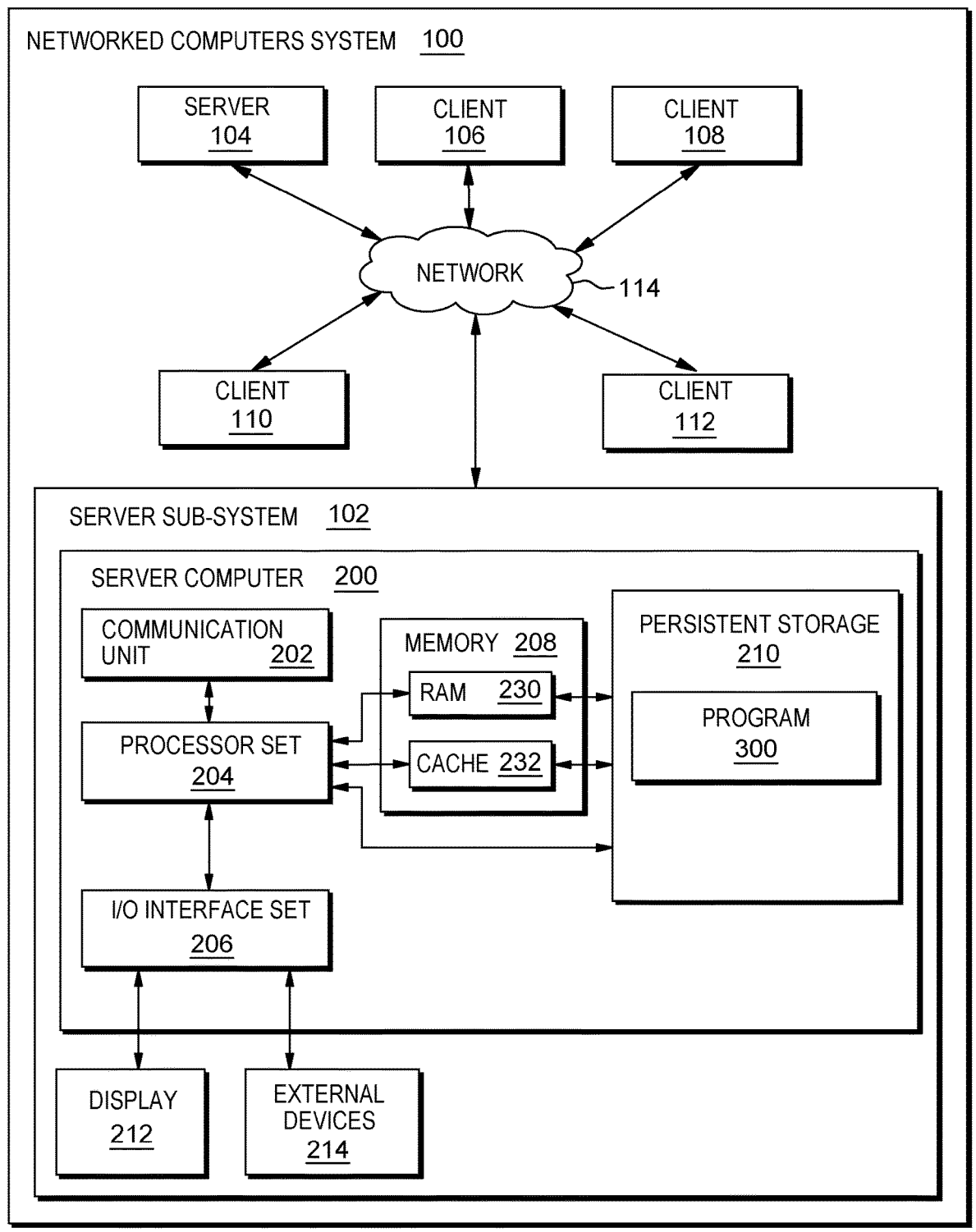
FIG. 1 is a block diagram view of a first embodiment of a system according to the present invention.

Some embodiments of the present invention are directed towards providing an automatic mechanism of invalidating false-positive indications of certain identified portions of source code to reduce the number of errors in a security report. Certain embodiments of the present invention utilize static security scanning as a mechanism for automatically determining which portions of the identified source code contain potential vulnerabilities, and whether these identified portions of the source code are correctly or incorrectly identified with a false-positive indication.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
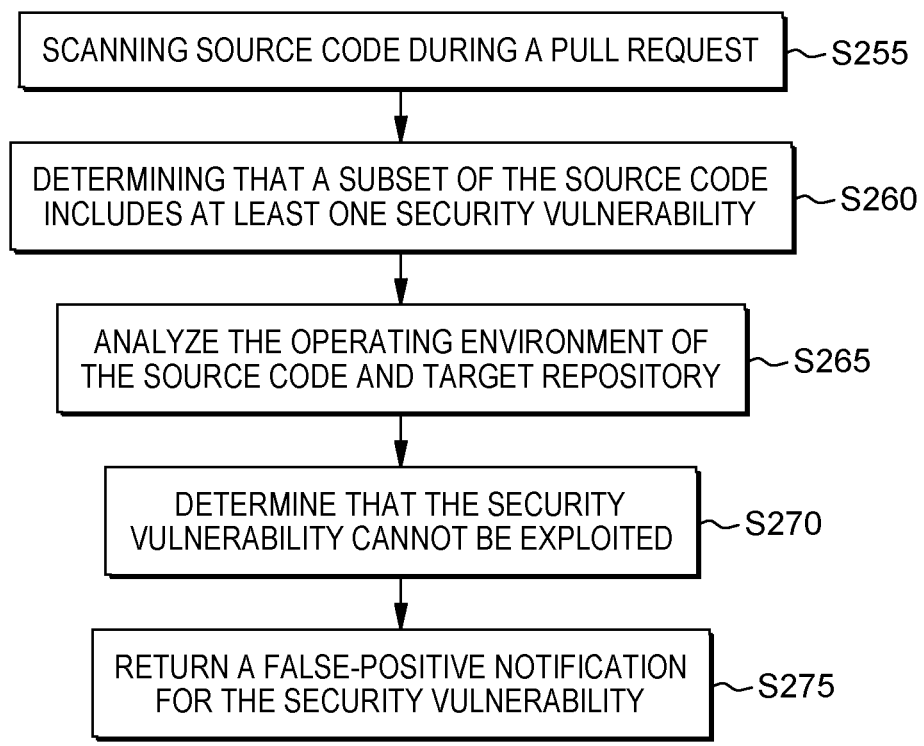
FIG. 2 is a flowchart showing a first embodiment method performed, at least in part, by the first embodiment system.
Figure 3:
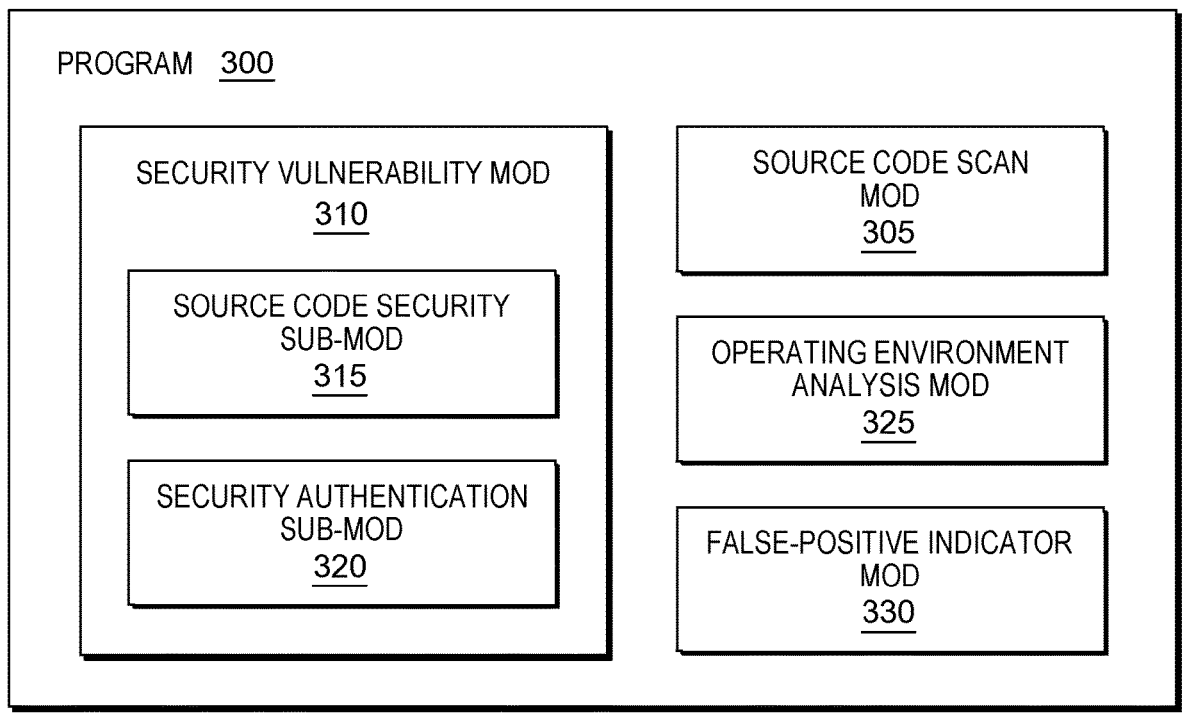
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation 5255, where source code scan module ("mod") 305 receives a set of source code from a target repository. In some embodiments of the present invention, a user initiates a pull request of the received set of source code. Subsequent to initiating the pull request of the received set of source code, source code scan mod 305 scans the set of source code to ultimately determine whether any security vulnerabilities exist.

Processing proceeds to operation 5260, where source code security sub-module ("sub-mod") 315 of security vulnerability mod 310 determines that at least one subset of the received set of source code (from operation 5255, above) contains a security vulnerability. The determination of whether a subset of source code contains any potential security vulnerabilities is discussed in greater detail in Sub-Section III, below.

Processing proceeds to operation 5265, where operating environment analysis mod 325 analyses the operating environment of the source code and the target repository. In this operation, operating environment analysis mod 325 takes into account factors such as: (i) whether the subset of source code is operating in a native or non-native environment, (ii) supported operating systems, (iii) supported hardware architectures (such as CPUs, GPUs, storage device controllers, etc.), (iv) supported application servers (such as JBoss, Websphere, and Weblogic), and (v) supported Java Virtual Machine versions/distributions.

Processing proceeds to operation 5270, where security authentication sub-mod 320 of security vulnerability mod 310 determines that the security vulnerability that exists in the subset of source code cannot be exploited, thereby rendering the identified security vulnerability as a false-positive.

Processing finally proceeds to operation 5275, where false-positive indicator mod 330 returns a false-positive notification to a user (who initiated the pull request) that the security vulnerability identified in the subset of source code is in fact a false-positive indication.

III. Further Comments and/or Embodiments

A static security scan is a type of scan that is typically performed on a product's source code and produces a list of security vulnerabilities that are found. Tools performing such a scan have their own database of known vulnerabilities or use an external database. One of the major flaws of scanning engines is that they find a higher-than-expected number of false-positive vulnerabilities. A false-positive security issue is an error in reporting. Such an issue makes the scan to falsely indicate a finding as an actual vulnerability. A scanning tool points to a specific line of the scanned code that contains a vulnerability. If it is a false-positive, an individual analyzing the scan results needs to mark this issue as false-positive in the scanning tool database (most likely using some kind of web user interface or a website). During the next scan, the same vulnerability will not be listed again because it will be matched with a proper entry in the database as a false-positive.

In some instances, the problem is that the scanned code might change in a way where this false-positive issue becomes a valid security vulnerability. This means that a list of false-positives has to be analyzed on a regular basis to indicate which of the identified false-positives have to be invalidated.

Further, besides the false-positives problem, the other disadvantage of static security scans is that a single scan can take anywhere from a few minutes up to several hours, depending on the scanning target's size and complexity. Ideally, the scans should be performed during pull requests, before merging a portion of the new code into the repository master branch. This essentially means that they need to be relatively fast.

Some embodiments of the present invention may include one, or more, of the following features, characteristics and/or advantages: (i) a new inspection module that would also be triggered before static code analysis and unmark known false positives related to the lines of code changed by the pull request and make the succeeding analyzing module not to skip or ignore these alarms; (ii) makes it impossible for the scanning security tool to ignore alarms previously marked as false-positives regardless of whether a developer remembers to unmark them manually or not (those alarms will be reported and they must be willingly and/or knowingly marked as false-positives by a developer—which increases confidence in the result); (iii) relates to automatically changing the list of false-positives; (iv) presents a solution to automatically enable alarms that were marked as false-positives during previous scans; (v) this approach can be used for both types of scans regardless of whether those scans are performed fully or with a subset of tests; and (vi) makes it easier to re-enforce necessary scans that analyze the source code of a module that eventually may be published and used by other parts as a dependency.

Some embodiments of the present invention include mechanisms of invalidating false-positives and quick new code changes scans. These mechanisms include at least the following: (i) perform a static/open source security scan only on a modified file subset of the target repository; (ii) automatic false positives invalidation when merging new repository changes; (iii) automatic triggers based on which false positives are invalidated; (iv) manually setup triggers to invalidate newly added false positives; and (v) perform a dynamic security scan only on a modified set of web application endpoints.

Each of these mechanisms will now be discussed in greater detail below.

(1) Perform a Static/Open Source Security Scan Only on a Modified File Subset of the Target Repository:

With respect to this first mechanism, some embodiments of the present invention provide two solutions that are used to address the problem of long scan execution times.

The first solution is shown through the following use case:

Given that static security scans are running on a regular basis (for example once a day), the following events occur: (i) a software developer creates a change set and tries to deliver it by opening a Pull Request (in a given repository); (ii) an automatic static scan check is triggered; and (iii) a list of possible vulnerabilities is presented.

Figure 4C:
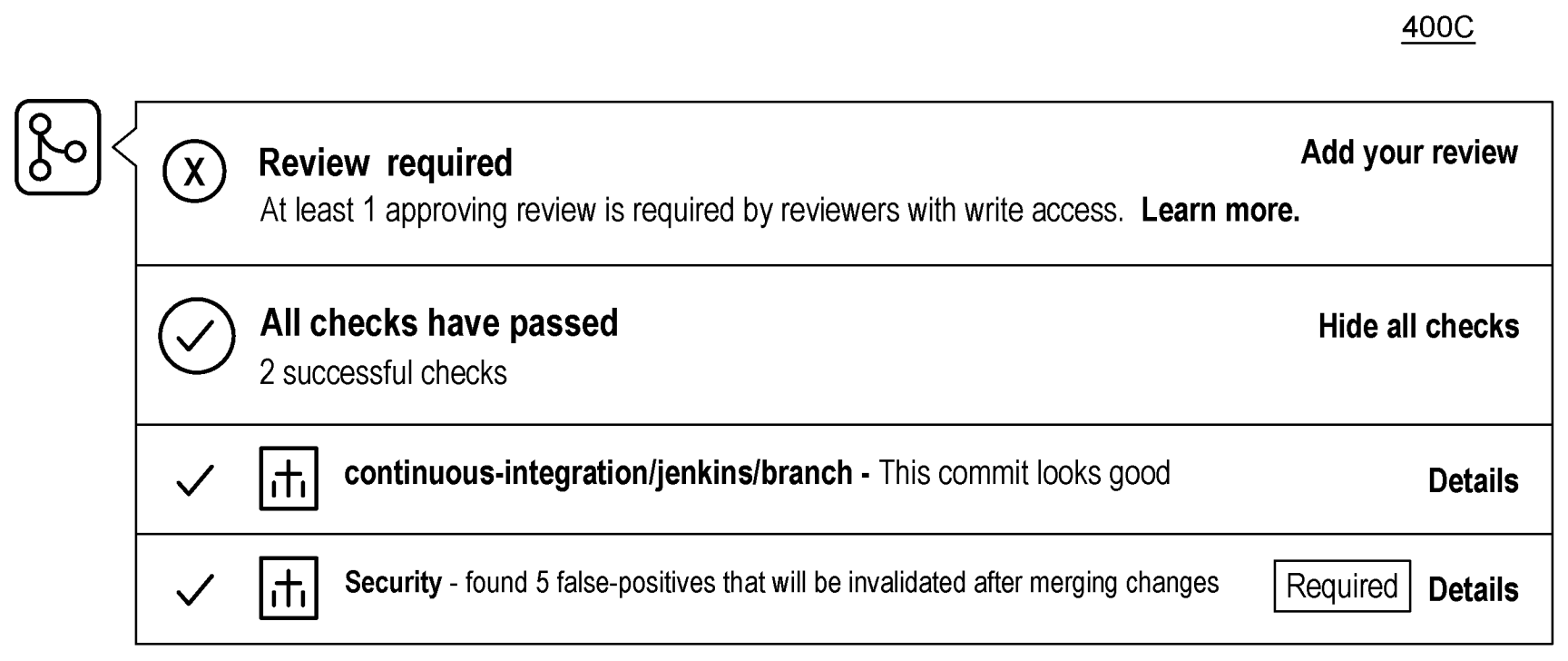

In one example, a script (that is run behind the scenes) tries to match the code lines (modified in the pull request) to the ones in which vulnerabilities were found in the past in regular daily scans. This particular script checks the scanning tool database to find out about those past vulnerabilities. If, for example, for the line incoming in the pull-request calculated a similarity to the vulnerable one is an 80% or greater similarity (as calculated by using Levenshtein distance), a flag is raised in the pull request that the line needs to be reviewed for potential security vulnerabilities. This implementation is much quicker and more efficient than executing a regular scan in every pull request. This result can be seen in screenshot 400a of FIG. 4A.

The second solution is shown through the following use case:

Consider the following scenario: (i) a software developer opens a pull request with the proposed repository changes; (ii) a script is executed; (iii) the script collects information about the changed files. This information can be retrieved for example using the repository REST API; (iv) a security scan configuration file is created. This file contains a list of files included in the scan; (v) a security scan is performed using the config file. Only files that are changed in the pull request are scanned; and (vi) results are presented in a form of a pull request check. It is marked successful when the scan did not find any vulnerabilities.

This solution is significantly faster than a whole repository scan. Screenshot 400b of FIG. 4B shows an example of a checker result from the same proprietary repository used to generate the scan results of screenshot 400a (as discussed in connection with the first solution, above).

(2) Automatic False Positives Invalidation when Merging New Repository Changes:

The script triggered when a pull request is open checks also the false positives database for the modified lines of code. If there is a false-positive for a particular line (which is being modified in the pull request) then a flag is raised in the PR saying that the false-positive for this line was found in the database and will be invalidated after merging the pull request. That way, if the new line is vulnerable, the issue previously marked as false-positive will not be ignored. This can be seen in screenshot 400c of FIG. 4C.

(3) Trigger-Based Invalidation of False Positives

In some embodiments, a false-positive marker assigned to a vulnerability found in a source code line is sometimes a "non zero-one choice" because it can depend on a number of other conditions that are formulated outside the product's source code. An example is a line in a code that introduces a vulnerability that can be manifested only for a subset of web browsers. This means that vulnerable code can be dangerous if the script is run by certain web browsers, but not those that are already immune to that code.

Another example is the fact that vulnerability can be dangerous for the environments (such as web browsers, JVM versions, etc.) that are actually not supported and/or certified by a product's owner. In this situation marking the vulnerability as a false-positive should be conditional and dependent on a matrix of supported environments kept in a document stored along the code in the repository, but available for the build process for verification. Every time this artifact changes and the change applies to information that affects false-positive vulnerability (or the entire group of those), a trigger should be able to automatically unmark those given vulnerabilities as false-positives and allow them to re-generate valid alarms.

In some embodiments, a regular security scan finds vulnerabilities an analysis by the person responsible needs to be performed. When it is decided that a particular issue can be marked as a false positive, the person responsible for determining the issue as being a potential false positive can also update the status to setup a trigger for invalidating this false positive in the future.

In some embodiments, automatic triggers are used to invalidate false positives depending on which groups of false positives are invalidated. Here, automatic triggers do not need to be manually setup and are introduced in an "out-of-the-box" manner and obligatory for every scan. Their specific details may be imposed by administrators, chief security officers, and the like. Consequently, these automatic triggers are not negotiable and cannot be disabled.

For example, there might be a strict rule that when there is a change in a technical documentation of a given software component, all false-positives found-and-marked during prior scans on the source code of that component are automatically invalidated and subsequent scan reports those errors again, if it finds them.

The use case for this example can be seen through this sequence of events (not necessarily in the following order): (i) security scanning tool (ST1) identifies potential vulnerability V1; (ii) a software engineer analyses V1 and decides that it is a false-positive (for example, there is no way to exploit this vulnerability because it is only possible with a first web browser when the user only supports a second web browser); (iii) the software engineer marks V1 as false-positive in the Security scanning tool (ST1); (iv) the software engineer provides a justification in ST1; (v) ST1 continuously checks if automatically triggered conditions are met; (vi) if the condition is met a false-positive assessment is invalidated, then the vulnerability has to be analyzed and addressed again.

Figure 5:
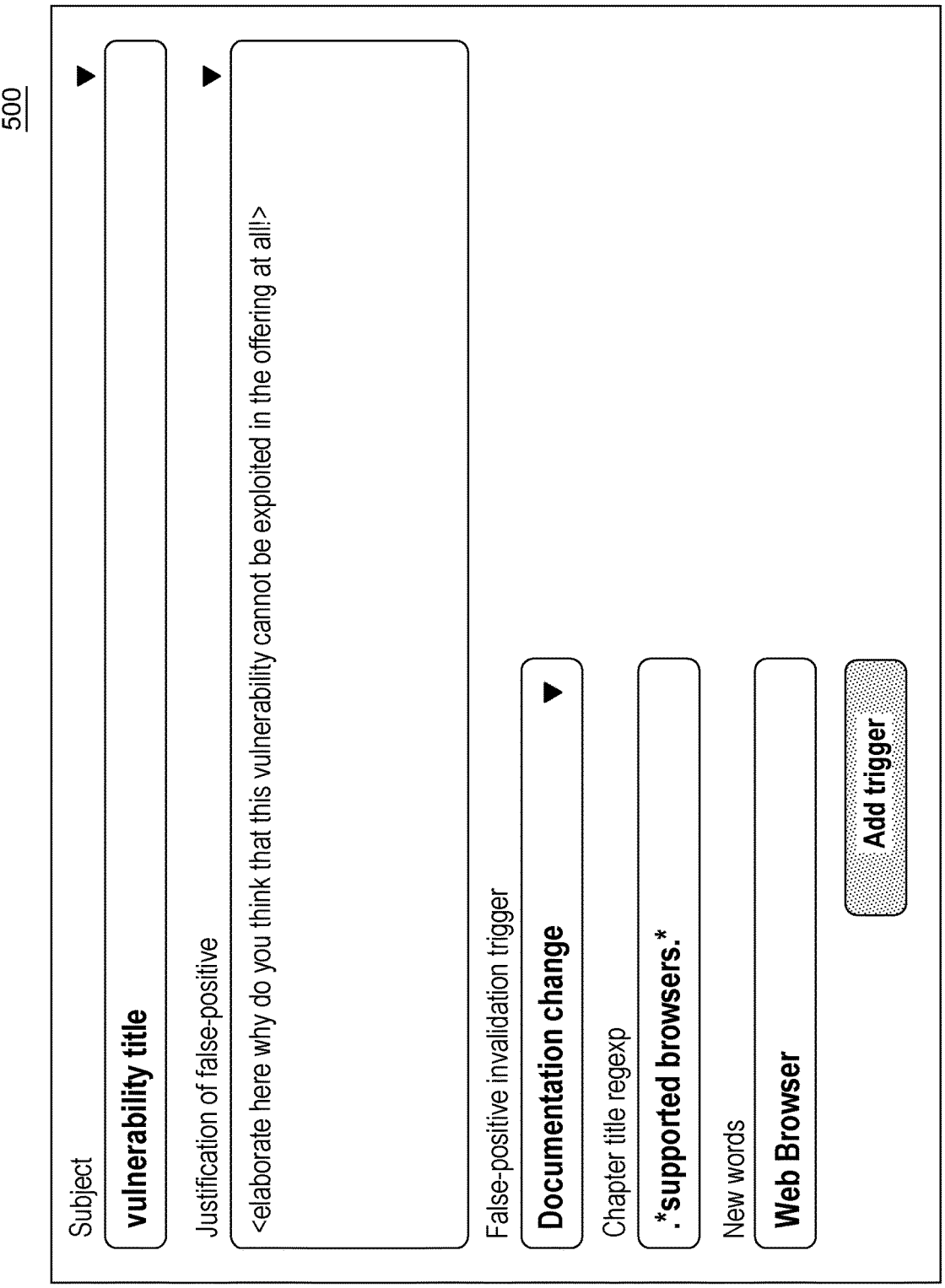
FIG. 5 is a screenshot view showing information that is generated by the first embodiment system.

One implementation of this use case is shown in screenshot 500 of FIG. 5. Screenshot 500 shows one implementation of creating a trigger for when a user is providing a justification for labeling certain false-positives (which will be discussed in greater detail below).

(4) Manually Setup Triggers to Invalidate Newly Added False Positives:

Some embodiments of the present invention setup triggers for invalidating false positives in order to reduce the time spent for re-analyzing false positives. For example, when marking a security finding as a false positive, a user can also manually create a trigger. During some of the next scans, the trigger can un-mark this false positive and force the scanner to check for false positives again.

Examples of trigger types include the following types: (i) timer trigger—invalidate false-positive based on time related configuration (after some time, at certain date, periodically); (ii) documentation monitor—invalidate false-positive by monitoring product documentation (changes in some chapters, new words, etc.); (iii) builds monitor—invalidate false-positive by monitoring build process (new platforms, new dependencies, compilers etc.); and (iv) firewalls monitor—invalidate false-positive based on changes in firewalls, DMZ's, proxies configuration etc.

In one example, a vulnerability is a false positive because it only occurs on an operating system that is currently not supported. In some embodiments, a file with operating systems support matrix is present in the code repository. A person responsible for marking the security vulnerability as false positive can manually set up a trigger. In this instance, the false positive is invalidated when the support matrix file is changed, and those triggers are setup when marking a security vulnerability as false-positive.

(5) Perform a Dynamic Security Scan on a Modified Set of Web Application Endpoints:

Embodiments of the present invention can be applied to dynamic security scans as well.

In one embodiment, there is a reduction of dynamic security code scans only to interfaces affected by code changes. In Quality Assurance practices there are known techniques to determine which endpoints/URLs should be re-tested after changes in code were made. These techniques could be used to determine a subset of security scanning scenarios to be conducted after the code change.

In another embodiment, dynamic security scans are used to invalidate false-positives in case of changes in interfaces. Consider the following instance where where the dynamic security scanning receives sensitive data that is sent as part of the request parameters. In this case, analysis of the alerts ends with a justification that it is a false-positive because it is a POST request. In order to remedy this, embodiments of the present invention detect code changes related to a given URL and invalidate those false-positives. In this example, there could be an invalidation of the false-positive as soon as the request is changed from POST to GET.

Additional examples of false-positives invalidation are mentioned below with respect to the alert type, false-positive justification, and triggers for false-positive invalidation.

(1) Alert: No Encryption (HTTP Vs HTTPS)

False-positive justification: no sensitive data is returned

Trigger for false-positive invalidation: change in data returned by given request (2) Alert: X-Content-Type-Options Header Missing False-positive justification: Only JSON (non-human readable) values are returned and no browser interprets it Trigger: the same URL start to return HTML content (3) Alert: Web Browser XSS Protection Not Enabled False-positive justification: CSP is in place Trigger for false-positive invalidation: reduced CSP or support for older browsers (4) Alert: Application Error Disclosure False-positive justification: Interface available only for super user Trigger for false-positive invalidation: changes in authorization to the interface.

Some examples of tools that be enhanced with such capabilities include HCL AppScan on Cloud and OWASP ZAP Proxy. Both of these tools have a functionality of dynamic security scans, management of findings, and maintenance of false-positives. Additionally, using both of these tools recognizes that the problem of hiding vulnerabilities by historical assessment of false-positives is inefficient.

Some embodiments of the present invention provides a method for invalidating false positives during security scans in pull requests. This method includes the following operations (not necessarily in the following order): (i) scanning, during a pull request of a target repository, a set of source code; (ii) determining one or more subsets of the set of source code include one or more security vulnerabilities; (iii) analyzing the operating environment for the set of source code and the target repository; (iv) determining, based on the analysis, the one or more security vulnerabilities cannot be exploited in the operating environment; and (v) returning, in response to the pull request, a false positive notification for the one or more security vulnerabilities.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: Without any Human Intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving, from a target repository, a set of source code from a first operating environment;
   scanning, during a pull request of the target repository, the set of source code;
   determining, by a security determination module, that a first subset of the source code includes a security vulnerability;
   analyzing the first operating environment for the set of source code and the target repository, with the analysis including determining whether the first operating environment for the set of source code and the target repository have a set of storage device controllers that are structured and configured to support the set of source code and the target repository;
   responsive to the analysis of the first operating environment, determining that the security vulnerability of the first subset of the source code cannot be exploited;
   responsive to the determination, returning a false positive notification for the security vulnerability; and
   setting up a trigger for invalidating a false positive based, at least in part, on which group of false positives is invalidated, the trigger for invalidating the false positive being set up in order to reduce a time spent re-analyzing false positives, the trigger for invalidating the false positive, during a next scan, unmarking the false positive and forcing a scanner to check again for false positives.

2. The method of claim 1 wherein the false positive notification for the security vulnerability is returned in response to a first pull request.

3. The method of claim 1 wherein the determination that the security vulnerability cannot be exploited is based, at least in part, upon running a script that matches the first subset of source code to code that contains recognized vulnerabilities.

4. The method of claim 3 wherein matching the first subset of source code to the code that contains recognized vulnerabilities is calculated by using a Levenshtein Distance.

5. The method of claim 1 wherein the false positive notification is returned for the security vulnerability based, at least in part, upon a determination that the first set of source code was run on a first web browser.

6. The method of claim 1 wherein the false positive notification is returned for the security vulnerability based, at least in part, upon a determination that the first set of source code was run in a non-native operating environment.

7. A computer program product (CPP) comprising:
   a machine-readable storage device; and
   computer code stored on the machine-readable storage device, with the computer code including instructions and data for causing a processor(s) set to perform operations including the following:
   receiving, from a target repository, a set of source code from a first operating environment,
   scanning, during a pull request of the target repository, the set of source code, determining, by a security determination module, that a first subset of the source code includes a security vulnerability, analyzing the first operating environment for the set of source code and the target repository, with the analysis including determining whether the first operating environment for the set of source code and the target repository have a set of storage device controllers that are structured and configured to support the set of source code and the target repository, responsive to the analysis of the first operating environment, determining that the security vulnerability of the first subset of the source code cannot be exploited, responsive to the determination, returning a false positive notification for the security vulnerability, and setting up a trigger for invalidating a false positive based, at least in part, on which group of false positives is invalidated, the trigger for invalidating the false positive being set up in order to reduce a time spent re-analyzing false positives, the trigger for invalidating the false positive, during a next scan, unmarking the false positive and forcing a scanner to check again for false positives.

8. The CPP of claim 7 wherein the false positive notification for the security vulnerability is returned in response to a first pull request.

9. The CPP of claim 7 wherein the determination that the security vulnerability cannot be exploited is based, at least in part, upon running a script that matches the first subset of source code to code that contains recognized vulnerabilities.

10. The method of claim 9 wherein matching the first subset of source code to the code that contains recognized vulnerabilities is calculated by using a Levenshtein Distance.

11. The CPP of claim 7 wherein the false positive notification is returned for the security vulnerability based, at least in part, upon a determination that the first set of source code was run on a first web browser.

12. The CPP of claim 7 wherein the false positive notification is returned for the security vulnerability based, at least in part, upon a determination that the first set of source code was run in a non-native operating environment.

13. A computer system (CS) comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving, from a target repository, a set of source code from a first operating environment, scanning, during a pull request of the target repository, the set of source code, determining, by a security determination module, that a first subset of the source code includes a security vulnerability, analyzing the first operating environment for the set of source code and the target repository, with the analysis including determining whether the first operating environment for the set of source code and the target repository have a set of storage device controllers that are structured and configured to support the set of source code and the target repository, responsive to the analysis of the first operating environment, determining that the security vulnerability of the first subset of the source code cannot be exploited, responsive to the determination, returning a false positive notification for the security vulnerability, and setting up a trigger for invalidating a false positive based, at least in part, on which group of false positives is invalidated, the trigger for invalidating the false positive being set up in order to reduce a time spent re-analyzing false positives, the trigger for invalidating the false positive, during a next scan, unmarking the false positive and forcing a scanner to check again for false positives.

14. The CS of claim 13 wherein the false positive notification for the security vulnerability is returned in response to a first pull request.

15. The CS of claim 13 wherein the determination that the security vulnerability cannot be exploited is based, at least in part, upon running a script that matches the first subset of source code to code that contains recognized vulnerabilities.

16. The CS of claim 15 wherein matching the first subset of source code to the code that contains recognized vulnerabilities is calculated by using a Levenshtein Distance.

17. The CS of claim 13 wherein the false positive notification is returned for the security vulnerability based, at least in part, upon a determination that the first set of source code was run on a first web browser.

18. The CS of claim 13 wherein the false positive notification is returned for the security vulnerability based, at least in part, upon a determination that the first set of source code was run in a non-native operating environment.

\* \* \* \* \*